(12) United States Patent
Hao et al.

(10) Patent No.: US 9,064,245 B2
(45) Date of Patent: Jun. 23, 2015

(54) GENERATING A CALENDAR GRAPHICAL VISUALIZATION INCLUDING PIXELS REPRESENTING DATA RECORDS CONTAINING USER FEEDBACK

(75) Inventors: Ming C. Hao, Palo Alto, CA (US); Umeshwar Dayal, Saratoga, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 217 days.

(21) Appl. No.: 13/402,229

(22) Filed: Feb. 22, 2012

(65) Prior Publication Data

US 2013/0215137 A1    Aug. 22, 2013

(51) Int. Cl.
*G06T 11/20* (2006.01)
*G09G 5/02* (2006.01)
*G06Q 10/10* (2012.01)

(52) U.S. Cl.
CPC .................................. *G06Q 10/1093* (2013.01)

(58) Field of Classification Search
None
See application file for complete search history.

(56) References Cited

U.S. PATENT DOCUMENTS

| | | | |
|---|---|---|---|
| 3,487,308 A | 12/1966 | Johnson | |
| 5,581,797 A | 12/1996 | Baker et al. | |
| 5,588,117 A | 12/1996 | Karp et al. | |
| 5,608,904 A | 3/1997 | Chaudhuri et al. | |
| 5,623,590 A | 4/1997 | Becker et al. | |
| 5,634,133 A | 5/1997 | Kelley | |
| 5,659,768 A | 8/1997 | Forbes et al. | |
| 5,694,591 A | 12/1997 | Du et al. | |
| 5,742,778 A | 4/1998 | Hao et al. | |
| 5,757,356 A | 5/1998 | Takasaki et al. | |
| 5,801,688 A | 9/1998 | Mead et al. | |
| 5,828,866 A | 10/1998 | Hao et al. | |
| 5,844,553 A | 12/1998 | Hao et al. | |
| 5,878,206 A | 3/1999 | Chen et al. | |
| 5,903,891 A | 5/1999 | Chen et al. | |
| 5,924,103 A | 7/1999 | Ahmed et al. | |
| 5,929,863 A | 7/1999 | Tabei et al. | |
| 5,940,839 A | 8/1999 | Chen et al. | |
| 5,969,706 A * | 10/1999 | Tanimoto et al. | 345/671 |
| 5,986,673 A | 11/1999 | Martz | |

(Continued)

OTHER PUBLICATIONS

Daniela Oelke, Ming Hao, Christian Rohrdantz, Daniel A. Keim, Umeshwar Dayal, Lars-Erik Haug, Halldór Janetzko, "Visual Opinion Analysis of Customer Feedback Data," Oct. 2009, IEEE, Symposium on Visual Analytics Science and Technology, 187-194.*

(Continued)

*Primary Examiner* — James A Thompson
(74) *Attorney, Agent, or Firm* — Trop, Pruner & Hu, P.C.

(57) ABSTRACT

A calendar graphical visualization is generated that includes an arrangement of blocks including pixels representing data records containing user feedback, wherein plural groups of the blocks represent different attributes of the data records, and wherein the blocks correspond to respective time intervals. A size of the blocks is determined based on identifying a union of time positions corresponding to data records received for the different attributes in a particular time interval of the time intervals. Pixels in a first of the blocks corresponding to a first of the attributes are aligned with pixels in a second of the blocks corresponding to a second of the attributes by placing gaps in the first and second blocks at respective time positions that are missing values for corresponding ones of the attributes.

21 Claims, 7 Drawing Sheets
(5 of 7 Drawing Sheet(s) Filed in Color)

(56) References Cited

U.S. PATENT DOCUMENTS

| | | | |
|---|---|---|---|
| 5,999,193 | A | 12/1999 | Conley, Jr. et al. |
| 6,052,890 | A | 4/2000 | Malagrino, Jr. et al. |
| 6,115,027 | A | 9/2000 | Hao et al. |
| 6,144,379 | A | 11/2000 | Bertram et al. |
| 6,211,880 | B1 | 4/2001 | Impink, Jr. |
| 6,211,887 | B1 | 4/2001 | Meier et al. |
| 6,269,325 | B1 | 7/2001 | Lee et al. |
| 6,314,453 | B1 | 11/2001 | Hao et al. |
| 6,377,287 | B1 | 4/2002 | Hao et al. |
| 6,400,366 | B1 | 6/2002 | Davies et al. |
| 6,429,868 | B1 | 8/2002 | Dehner, Jr. et al. |
| 6,466,946 | B1 | 10/2002 | Mishra et al. |
| 6,466,948 | B1 | 10/2002 | Levitsky et al. |
| 6,502,091 | B1 | 12/2002 | Chundi et al. |
| 6,584,433 | B1 | 6/2003 | Zhang et al. |
| 6,590,577 | B1 | 7/2003 | Yonts |
| 6,603,477 | B1 | 8/2003 | Tittle |
| 6,658,358 | B2 | 12/2003 | Hao et al. |
| 6,684,206 | B2 | 1/2004 | Chen et al. |
| 6,727,926 | B1 | 4/2004 | Utsuki et al. |
| 7,020,869 | B2 | 3/2006 | Abrari et al. |
| 7,202,868 | B2 | 4/2007 | Hao |
| 7,221,474 | B2 | 5/2007 | Hao et al. |
| 7,313,533 | B2 | 12/2007 | Chang et al. |
| 7,567,250 | B2 | 7/2009 | Hao et al. |
| 7,714,876 | B1 | 5/2010 | Hao |
| 7,760,203 | B1 | 7/2010 | Hao |
| 7,924,283 | B1 | 4/2011 | Hao |
| 7,986,324 | B2 * | 7/2011 | Funaki et al. ............... 345/440 |
| 8,862,577 | B2 | 10/2014 | Hao |
| 2002/0118193 | A1 | 8/2002 | Halstead, Jr. |
| 2003/0065546 | A1 | 4/2003 | Goruer et al. |
| 2003/0071815 | A1 | 4/2003 | Hao et al. |
| 2003/0221005 | A1 | 11/2003 | Betge-Brezetz et al. |
| 2004/0210540 | A1 | 10/2004 | Israel et al. |
| 2005/0066026 | A1 | 3/2005 | Chen et al. |
| 2005/0119932 | A1 | 6/2005 | Hao |
| 2005/0219262 | A1 | 10/2005 | Hao et al. |
| 2007/0225986 | A1 | 9/2007 | Bowe, Jr. et al. |
| 2008/0163085 | A1 * | 7/2008 | Subbu et al. ............... 715/763 |
| 2008/0180382 | A1 * | 7/2008 | Hao et al. ............... 345/100 |
| 2009/0033664 | A1 | 2/2009 | Hao et al. |
| 2010/0010864 | A1 | 1/2010 | Lee |
| 2010/0063864 | A1 | 3/2010 | Lewis |
| 2010/0312769 | A1 | 12/2010 | Bailey |
| 2010/0325107 | A1 | 12/2010 | Kenton |
| 2011/0029926 | A1 | 2/2011 | Hao |
| 2011/0043652 | A1 | 2/2011 | King |

OTHER PUBLICATIONS

B. Shneiderman, "Tree Visualization with Treemaps: a 2-D Space-Filling Approach", pp. 1-10, Jun. 1991.

D. Keim et al "Hierarchical Pixel Bar Charts", IEEE Transactions on Visualization and Computer Graphics, vol. 8, No. 3, Jul.-Sep. 2002, pp. 255-269.

D. Keim et al Pixel Bar Charts: A New Technique for Visualization Large Multi-Attribute Data Sets with Aggregation:, HP Technical Report, Apr. 2001, pp. 1-10.

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

Deun et al., Multidimensional Scaling, Open and Distance Learning, Jan. 12, 2000 (pp. 1-16).

http://www.pavis.org/essay/multidimensional_scaling.html, 2001 Wojciech Basalaj, (pp. 1-30).

M. Ankerst et al "Towards an effective cooperation of the computer and the computer user for classification, Proc. 6th Int. Conf. on Knowledge Discovery and Data Mining ," (KDD'2000), Aug. 20-23, 2000, Boston, MA, 2000, pp. 1-10.

M.C. Hao et al "Visual Mining of E-customer Behavior Using Pixel Bar Charts,", HP Technical Report, Jun. 20, 2001, pp. 1-7.

* cited by examiner

US 9,064,245 B2

GENERATING A CALENDAR GRAPHICAL VISUALIZATION INCLUDING PIXELS REPRESENTING DATA RECORDS CONTAINING USER FEEDBACK

BACKGROUND

Customers can provide feedback, in the form of reviews, regarding offerings (products or services) of an enterprise. Reviews can be submitted online at third party sites (e.g. web survey sites or social networking sites such as Facebook and Twitter), or alternatively, reviews can be received directly by an enterprise. There can be potentially a large number of received reviews, which can make meaningful analysis of such reviews difficult and time-consuming.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures.

DETAILED DESCRIPTION

An enterprise (e.g. a business concern, educational organization, government agency, etc.) may collect feedback from customers (or more generally "users") to better understand user sentiment regarding an offering of the enterprise. An offering can include a product or a service provided by the enterprise. A "sentiment" refers to an attitude, opinion, or judgment of a human with respect to the offering (e.g. level of satisfaction with a product or service). An opinion or other sentiment can be mapped to an attribute (such as an attribute associated with an offering or any attribute about which a sentiment can be expressed) to indicate a degree of satisfaction or other sentiment.

If there are a relatively large number of users, then there can be relatively large amounts of user feedback. An enterprise can provide an online website to collect feedback from users. Alternatively or additionally, the enterprise can also collect feedback through telephone calls or on paper survey forms. Furthermore, feedback can be collected at third party sites, such as travel review websites, product review websites, social networking sites (such as Facebook and Twitter), web survey sites, and so forth. Some third party websites provide professional reviews of offerings from enterprises, as well as provide mechanisms for users to submit their individual reviews.

Visualizing relatively large volumes of data records can be a complex and time-consuming process. In some cases, there can be several attributes of interest to a user, which can add to the amount of information that has to be depicted in a graphical visualization.

Figure 1:
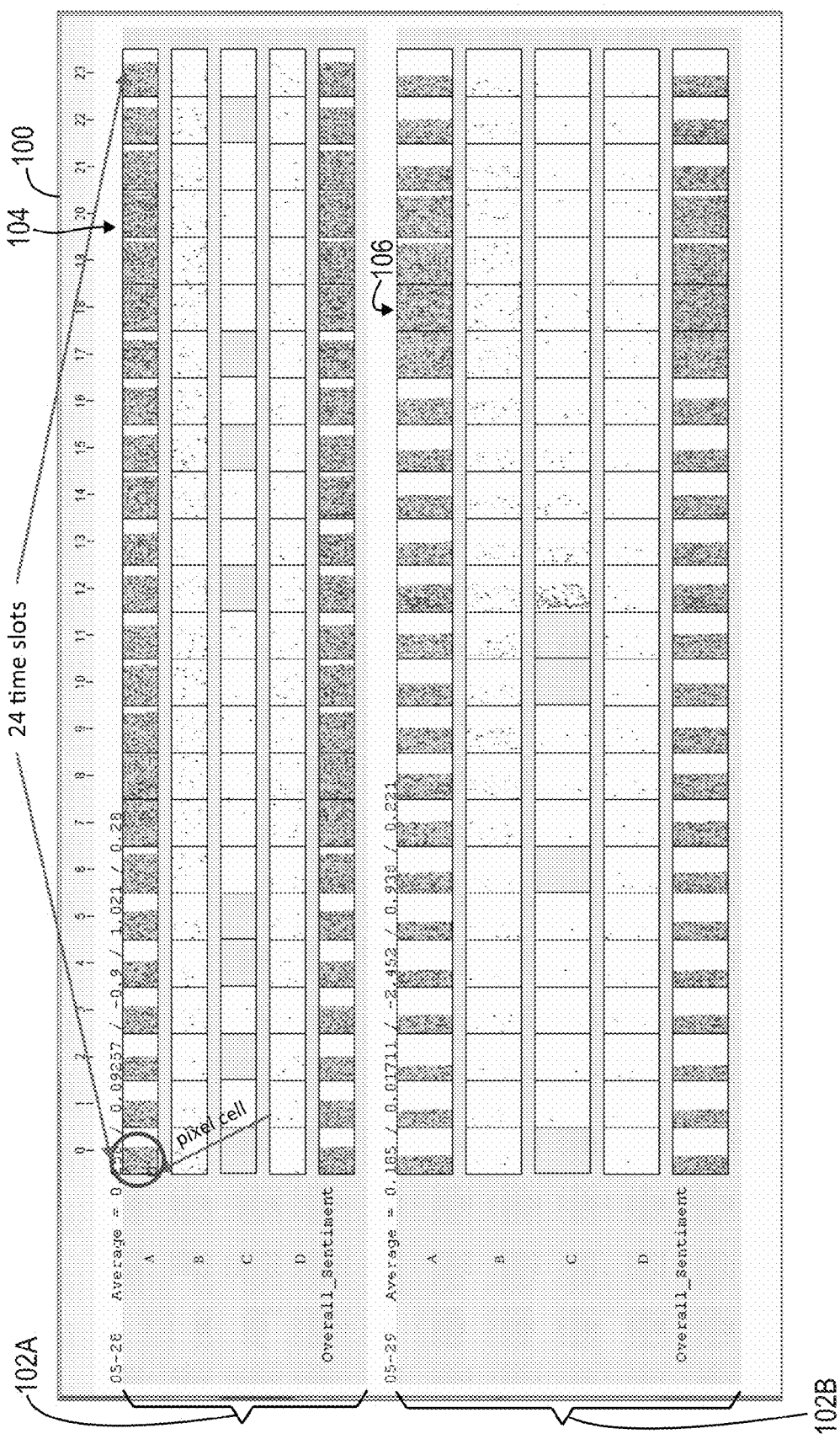
FIG. 1 illustrates a calendar graphical visualization for visualizing data records according to some implementations.

In accordance with some implementations, such as according to FIG. 1, a calendar graphical visualization 100 is provided that includes pixels representing sentiments in data records received in user reviews. A calendar graphical visualization provides a representation of data in multiple time dimensions. For example, in the calendar graphical visualization 100, a first time dimension (hours) is represented by columns of blocks (where each block is a rectangle). In examples according to FIG. 1, there are 24 columns (which correspond to the 24 hours of a day).

A second time dimension (e.g. days) of the calendar graphical visualization 100 is represented by respective collections 102A and 102B of blocks. Each collection 102A or 102B includes multiple rows of blocks, where each of the rows within a collection corresponds to a respective different attribute (attributes A, B, C, D, and Overall_Sentiment depicted in FIG. 1). The collection 102A includes blocks for a first day (e.g. May 28 or 05-28), while the collection 102B includes blocks for a second day (e.g. May 29 or 05-29). In each collection 102A or 102B, each row of blocks corresponds to a different attribute that may be of interest to an analyst.

The attributes A, B, C, and D can represent any attribute for which a sentiment can be expressed. Attributes can include nouns (individual nouns or compound nouns) that appear in user feedback, where the nouns are associated with sentiment words that express a sentiment. Examples of attributes include specific products or services (e.g. printers, computers, customer support, movies, characters in movies, etc.). Examples of sentiment words include "good", "bad", "poor", "satisfied", and so forth.

In examples according to FIG. 1, the first row of blocks in the collection 102A contains pixels representing sentiment values for attribute A, the second row of blocks in the collection 102A contains pixels representing sentiment values for attribute B, the third row of blocks in the collection 102A contains pixels representing sentiment values for attribute C, the fourth row of blocks in the collection 102A contains pixels representing sentiment values for attribute D, and the fifth row of blocks in the collection 102A contains pixels representing sentiment values for the attribute Overall_Sentiment. The different rows of blocks in the collection 102B similarly include rows for respective attributes A, B, C, D, and Overall_Sentiment.

The attribute Overall_Sentiment represents an aggregate of sentiment values expressed with respect to attributes A through D. In other words, each pixel in a row corresponding to Overall_Sentiment has a sentiment value that is an aggregate (e.g. sum, average, maximum, minimum, etc.) of sentiment values corresponding to attributes A-D, respectively.

The pixels within each block in the calendar graphical visualization 100 are assigned visual indicators to depict the corresponding sentiment values of the respective attribute. For example, the visual indicators can include different colors. A first color can be assigned to a pixel for a positive user sentiment expressed with respect to the corresponding attribute, while a second, different color can be assigned to represent a negative user sentiment expressed with respect to the attribute. In some examples, a positive sentiment can be indicated by a green color while a negative sentiment can be indicated by a red color. Different shades of green can express different levels of positive user sentiment (e.g. darker green can express a more positive user sentiment than lighter green). Similarly, different shades of red can express different levels of negative user sentiment (e.g. darker red can express a more negative sentiment than lighter red). A neutral sentiment can be expressed by a different color, such as a gray color. In other examples, other colors can be used to express different sentiments.

In some examples, the sentiment expressed in a particular data record for a given attribute can be based on scores assigned by a user (e.g. a score between 1 and 5, where 5 is positive while 1 is negative and 3 is neutral, or a score from among −2, −1, 0, +1, +2, where the positive values reflect positive sentiment, negative values reflect negative sentiment, and 0 reflects a neutral sentiment). In other examples, the sentiment expressed in a particular data record for a given attribute can be based on an analysis of words in the particular data record—for example, the analysis can identify sentiment words associated with nouns representing targets of the sentiment words, and the sentiment words can be processed to determine the corresponding sentiment (e.g. positive sentiment, negative sentiment, neutral sentiment).

More generally a calendar graphical visualization such as the calendar graphical visualization 100 of FIG. 1 includes an arrangement of blocks, where the arrangement of blocks has multiple dimensions corresponding to respective different time dimensions. A first of the time dimensions defines first time intervals, while a second of the time dimensions defines second time intervals, where the first and second time intervals are different (e.g. seconds, hours, days, weeks, months, etc.).

Each block of the calendar graphical visualization contains an arrangement of pixels. The block has an array of positions that correspond to different sub-time intervals (e.g. seconds or minutes in the example of FIG. 1 where each block represents an hour). The pixels are arranged at respective positions in the block according to values of a time attribute of the corresponding data records represented by the pixels. The time attribute can indicate a time at which the data record was created, received, and so forth.

Within each block of the calendar graphical visualization 100, pixels are ordered (or sorted) according to time attribute values of respective data records represented by the pixels. The time attribute can represent a time of receipt or arrival of a data record (by a system), or can represent a time of creation of a data record. In some examples, within a block, pixels are arranged by placing a pixel corresponding to an earliest time value in the lower, left corner of the block, with successive pixels (having increasing time attribute values) proceeding left to right and then upwardly in sequence in the block. The pixel representing the latest data record (the data record associated with the largest time attribute value) is placed in the upper, right corner of the block. In different examples, different ordering of pixels within a block can be employed.

Figure 2:
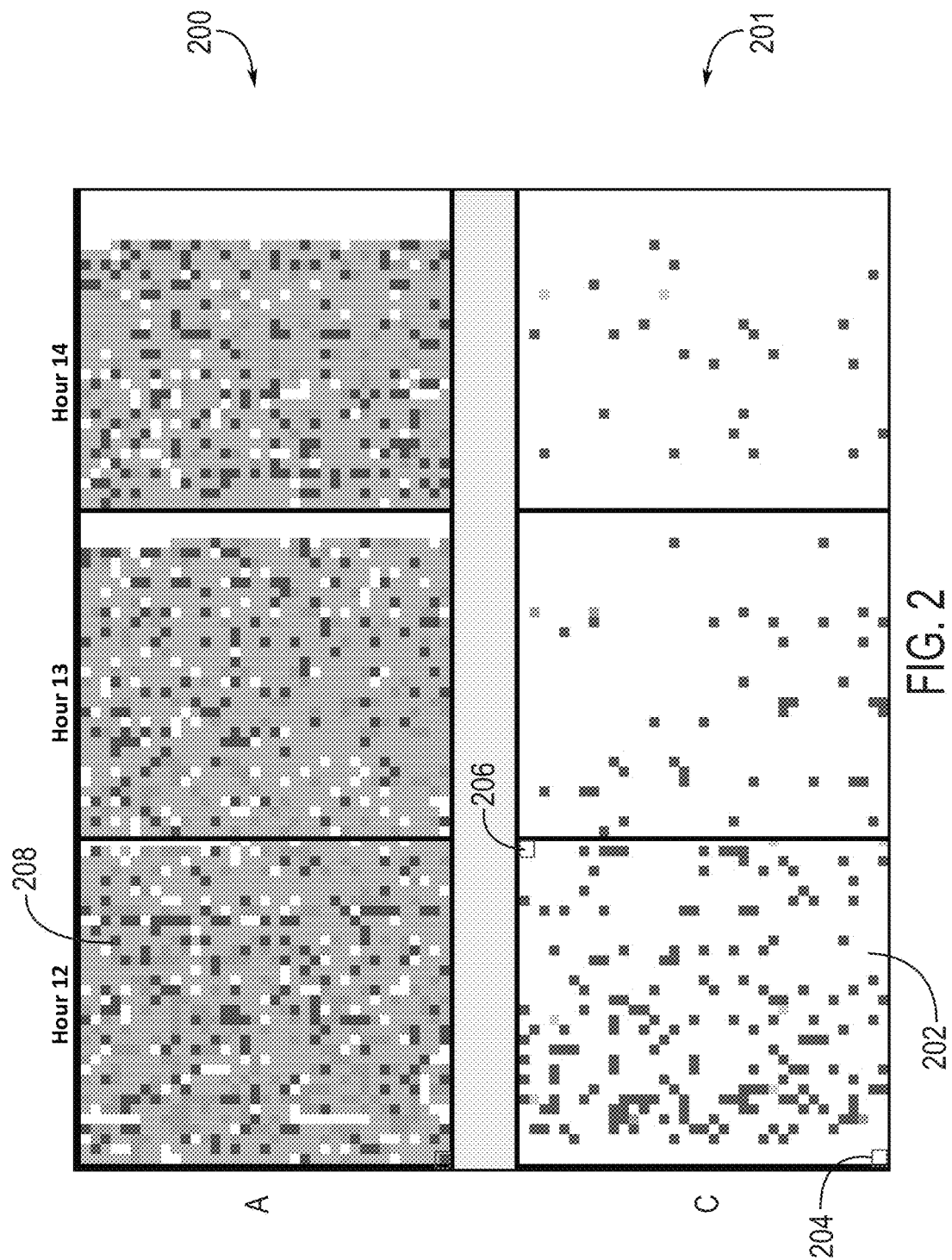
FIG. 2 illustrates a portion of the calendar graphical visualization of FIG. 1, according to some examples.

FIG. 2 shows a portion of the calendar graphical visualization 100 of FIG. 1. Portions of two rows of blocks are depicted in FIG. 2, where a first row 200 of blocks corresponds to attribute A, while a second row 201 of blocks corresponds to attribute C. In the example of FIG. 2, the three columns of blocks correspond to hours 12, 13, and 14, respectively. Within a given block 202, the lower, left corner 204 corresponds to a time position for a data record having a lowest time value, while the upper, right corner 206 of the given block 202 corresponds to a time position for a data record having a largest number of data records received for the different attributes in a particular time interval of the time intervals. In the example of FIG. 2, time positions 204 and 206 do not have corresponding pixels, since there are missing (no) data records at the corresponding times for attribute C. However, note that there are data records at those time positions for other attributes in FIG. 1. More generally, in some examples, the block 202 has an arrangement of time positions that start at lower, left corner and proceed until the time positions reach the upper, right corner.

A particular data record can contain sentiment expressed with respect to one or multiple attributes. For example a first data record can contain a user sentiment expressed with respect to attributes A, B, C, and D; a second data record can contain user sentiment expressed with respect to just attributes A and C; a third data record can contain user sentiment expressed with respect to just attribute B; and so forth. Thus, not all data records contain user sentiment expressed with respect to all attributes of interest to an analyst.

Additionally, there can be missing data records at certain sub-time intervals. For example, within a given hour, data records may not be received for certain time points (sub-time intervals).

As a result of the foregoing two issues, within a given block of the calendar graphical visualization 100, there can be time positions in the given block not associated with sentiment values (due to a data record not containing a sentiment for the attribute at the corresponding sub-time interval, or due to a missing data record at the corresponding sub-time interval).

For example, in block 202 shown in FIG. 2, pixels that are assigned either a red color, gray color, or green color represent data records that have been received at respective time positions in the block 202. However, other time positions in the block 202 do not include pixels assigned a red color, gray color, or green color, either because data records have not been received for those time positions or the data records received at those time positions do not have sentiments expressed with respect to the corresponding attribute. In accordance with some implementations, the time positions within a block that are missing sentiment values for a corresponding attribute are assigned gaps. A "gap" refers to a graphical element that is assigned a predefined visual indicator (e.g. white color in the example of FIG. 2 or other predefined color in other examples) for indicating that a sentiment value does not exist for the corresponding attribute.

In the example of FIG. 2, there are many more gaps in the block 202 corresponding to attribute B than there are gaps in block 208 corresponding to attribute A. Both blocks 202 and 208 represent the same time interval (hour 12 of a particular day). In hour 12, there are many more data records received that have expressed user sentiment with respect to attribute A than there are data records received that have expressed user sentiment with respect to attribute B. The time positions in block 208 are the same time positions as in block 202. The time positions within each block are included in a union of time positions corresponding to data records received for the different attributes in a time interval associated with the largest number of data records. For example, in FIG. 1, the time positions for each block in the collection 102A of blocks are based on a union of time positions of data records received for attribute A, time positions of data records received for attribute B, time positions of data records received for attribute C, and time positions of data records received for attribute D. As a specific example, for hour 20 (column 104 in FIG. 1), if a data record is received for attribute A at time position 20:01 (but no data record is received for the other attributes B, C, and D at time position 20:01), and a data record is received for attribute C at time position 20:23 (but no data record is received for the other attributes A, B, and D at time position 20:23), the union of time positions would include both time positions 20:01 and 20:23, such that these time positions would be filled either with a pixel (in each block corresponding to an attribute for which a data record was received) or a gap (in each block corresponding to an attribute for which a data record is missing).

In FIG. 1, the time interval corresponding to column 104 is the time interval with the largest number of data records (combined number of data records for attributes A-D), so that the array of time positions for each block in the collection 102A of blocks is based on the number of distinct time positions for the data records in column 104.

Similarly, in FIG. 1, for the collection 102B of blocks, the time interval corresponding to column 106 is the time interval with the largest number of data records (combined number of data records for attributes A-D), so that the array of time positions for each block in the collection 102B of blocks is based on the number of distinct time positions for the data records in column 106 (by combining the number of the data records for attributes A-D).

The gaps that have been introduced into the blocks 202 and 208 allow for the pixels placed in the blocks 202 and 208 to be aligned in the time, according to time position. In other words, assuming that each block 202 and 208 includes an array of time positions, any given time position in the array of block 202 is for the same sub-time interval as the same given time position in the array of block 208. Note that the array of time positions in block 202 is identical to the array of time positions in block 208. In this way, by comparing pixels (or gaps) in blocks 202 and 208, an analyst can easily determine time correlation between sentiment expressed (or lack of sentiment expressed) with respect to attributes A and B at different time positions.

User feedback regarding different attributes can occur at arbitrary time points. To align user feedback across different attributes in the calendar graphical visualization 100 of FIG. 1, gaps are introduced into the blocks to allow for the time alignment of pixels that represent sentiment expressed with respect to the different attributes. The time alignment of pixels allows for a determination of correlations between attributes.

Figure 3:
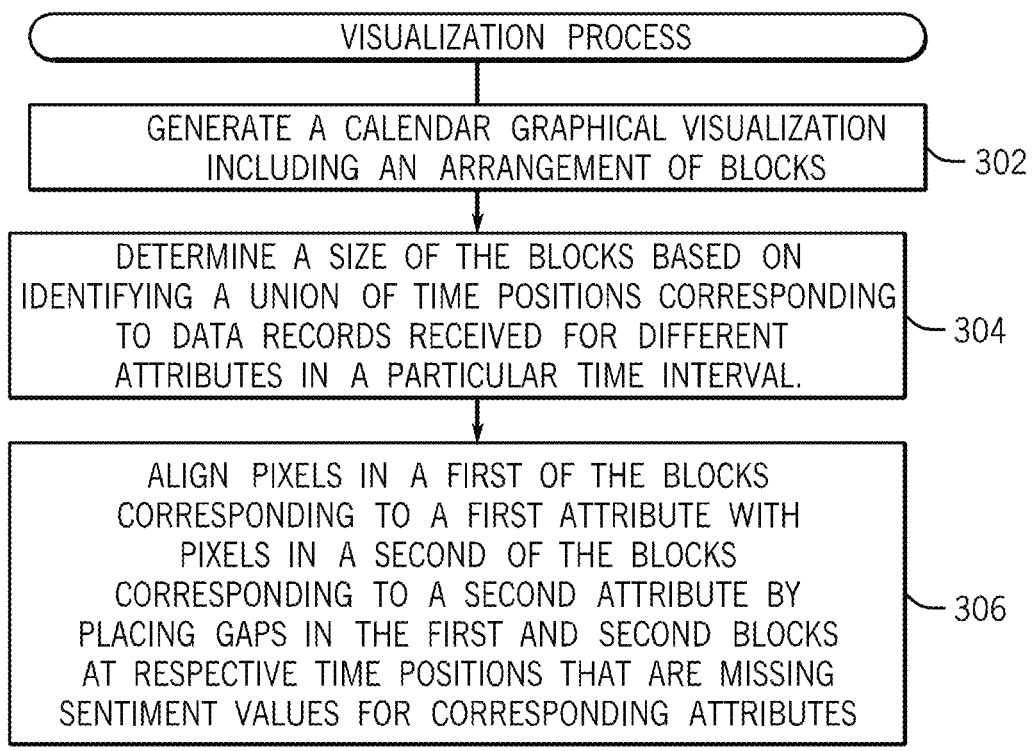
FIG. 3 is a flow diagram of a visualization process according to some implementations.

FIG. 3 is a flow diagram of a visualization process according to some implementations. The process includes generating (at 302) a calendar graphical visualization (e.g. 100 in FIG. 1) that includes an arrangement of blocks including pixels representing data records that contain user feedback. Multiple groups (e.g. rows) of the blocks represent different attributes of the data records, where the blocks correspond to respective time intervals (e.g. hours).

The process determines (at 304) a size of the blocks based on identifying a union of time positions corresponding to data records received for the different attributes in a particular time interval of the time intervals, where the particular time interval is the one that contains a largest number of the data records. For example, in FIG. 1, for day 05-28, the time interval containing the largest number of pixels is hour 20 for attribute A (column 104). By defining the size of blocks to be used in the collection 102A based on identifying a union of time positions corresponding to data records received for the different attributes in the time interval having the largest number of data records, that allows each block to have a sufficient number of time positions to accommodate such largest number of data records. In this manner, the time positions between any two blocks in the collection 102A can be time aligned, to allow for an analyst to identify correlations between sentiments for different attributes.

The size of each block for the collection 102B is similarly defined.

For each particular day of the calendar graphical visualization 100, the blocks used to represent the different attributes all have the same size. However, note that the height of the blocks can differ between blocks for different days. The height of a block for day 05-29 (in collection 102B) is greater than the height of a block for day 05-28 (in collection 102A). However, the width of the blocks for the different days 05-28 and 05-29 are the same.

The process of FIG. 3 further aligns (at 306) pixels corresponding to the different attributes represented by the plural rows by placing gaps in respective blocks at respective time positions that are missing sentiment attribute values. For example, pixels in a first of the blocks corresponding to a first of the attributes are time aligned with pixels in a second of the blocks corresponding to a second of the attributes by placing gaps in the first and second blocks at respective time positions that are missing sentiment values for corresponding attributes.

Figure 4:
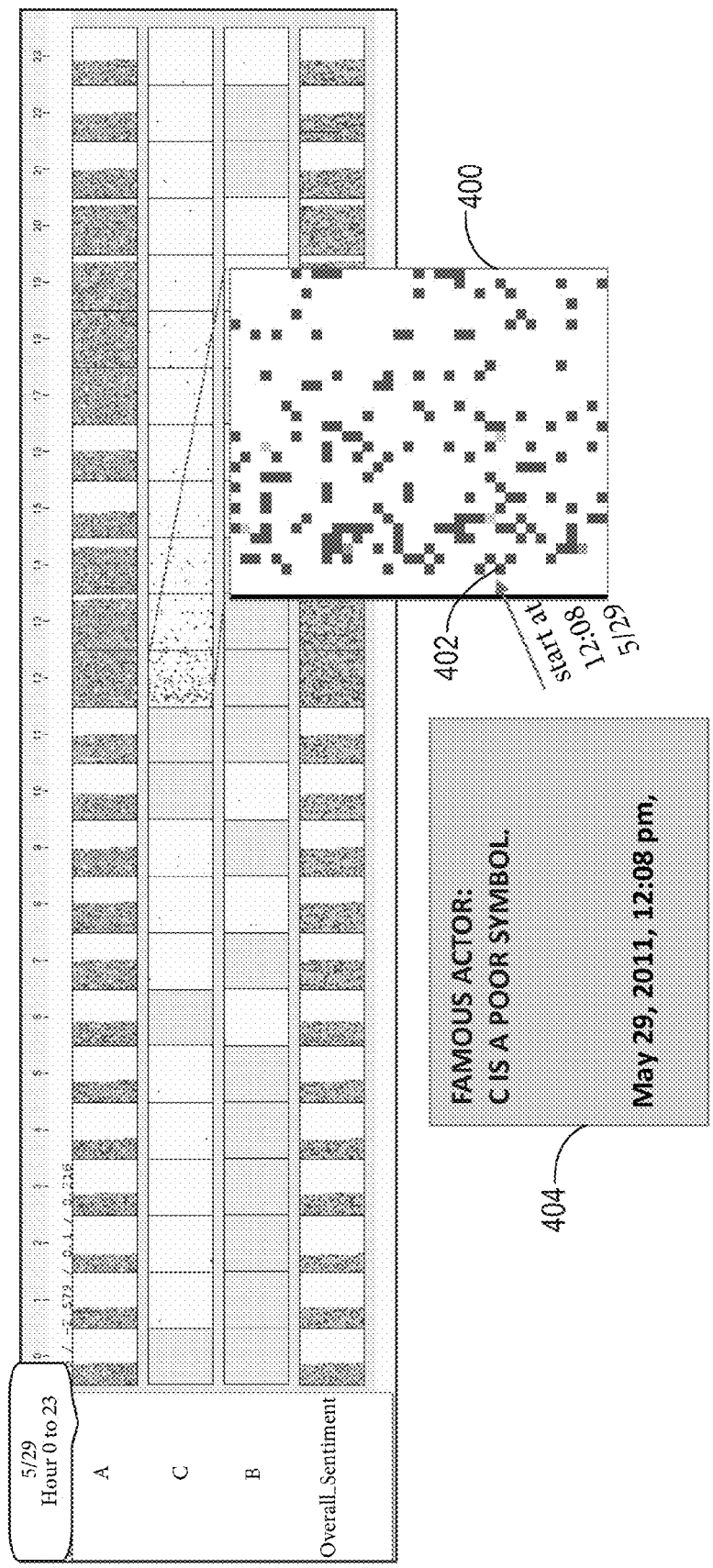
FIG. 4 illustrates a portion of a calendar graphical visualization in which a pop-up box is provided to depict more detailed information regarding a data record, in accordance with some examples.

In accordance with some implementations, an analyst can select a particular pixel to obtain more information regarding the corresponding data record. For example, as shown in FIG. 4, an analyst can move a cursor, by using an input device such as a mouse, touchpad, or touchscreen, over a pixel 402 in block 400. The block 400 corresponds to hour 12 and contains pixels representing sentiment values for attribute C. Moving the cursor over the pixel 402 causes a pop-up box 404 to be shown, which contains the actual user review corresponding to the pixel 402. In the example of FIG. 4, the pop-up box 404 contains feedback from a famous actor, which states that C is a poor symbol. The pop-up box 404 also contains the time at which the review was received.

The block 400 may be of particular interest to an analyst because of the relatively larger number of negative sentiments (represented by red pixels) expressed with respect to attribute C at hour 12 on day 05-29. An analyst can select different ones of the pixels in the block 400 (by moving a cursor over the respective pixels) to retrieve the detail information associated of the corresponding data records. This can allow the analyst to identify whether there was any particular review that influenced the other negative reviews. In the example given in FIG. 4, the review received on May 29, 2011, at 12:08 p.m., by a famous actor stating that C is a poor symbol, likely influenced later received negative reviews on the same day from other reviews.

Figure 5:
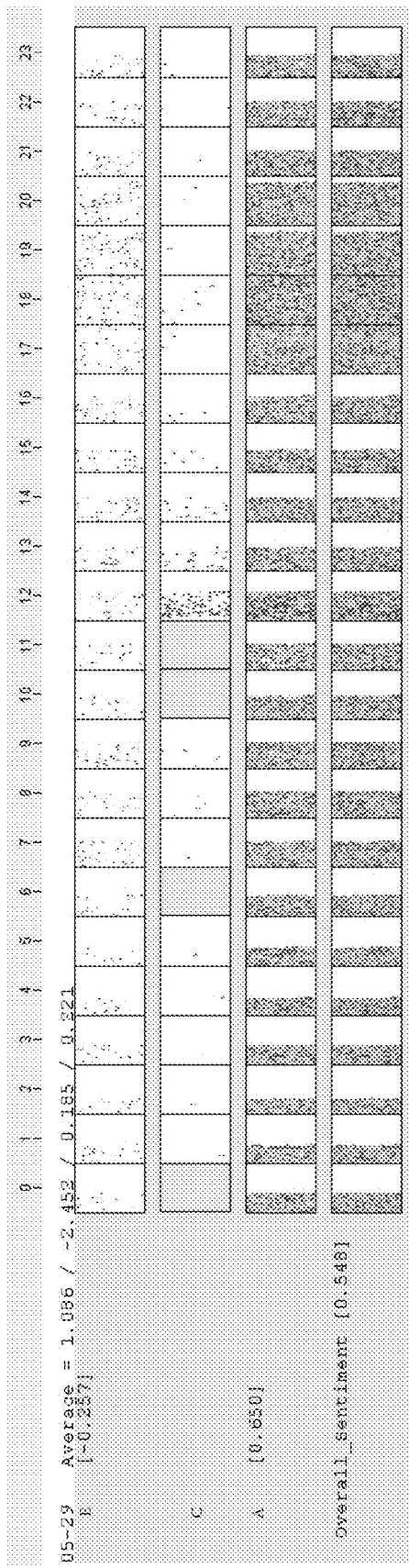
FIG. 5 illustrates a portion of a calendar graphical visualization for correlating different attributes, in accordance with some examples.

Techniques or mechanisms according to some implementations also allow for correlation to be identified between attributes. For example, an analyst may determine based on the calendar graphical visualization portion shown in FIG. 4 that a larger amount of negative sentiment has been expressed with respect to attribute C on a particular day (e.g. 05/29). The analyst can focus on this attribute C, such as by clicking on a block corresponding to attribute C or selecting a region (such as by using a rubber-band user selection operation) that contains multiple blocks corresponding to attribute C. Such selection of an attribute can cause a query to be issued for correlating attribute C to other attributes. For example, as shown in FIG. 5, the query submitted due to selection of a block (or blocks), or other portion of the calendar graphical visualization, corresponding to attribute C causes several other attributes to be displayed (along with their corresponding blocks of pixels). In the example in FIG. 5, it is determined that attribute A has the highest positive correlation (represented by correlation measure +0.650) to attribute C, while attribute E has the highest negative correlation (represented by correlation measure −0.257) to attribute C. The correlation of the attribute Overall Sentiment to attribute C is also shown (e.g. +0.548). The correlation measures are computed based on application of any of various correlation techniques that are able to determine measures of relationships between any pair of attributes.

Figure 6:
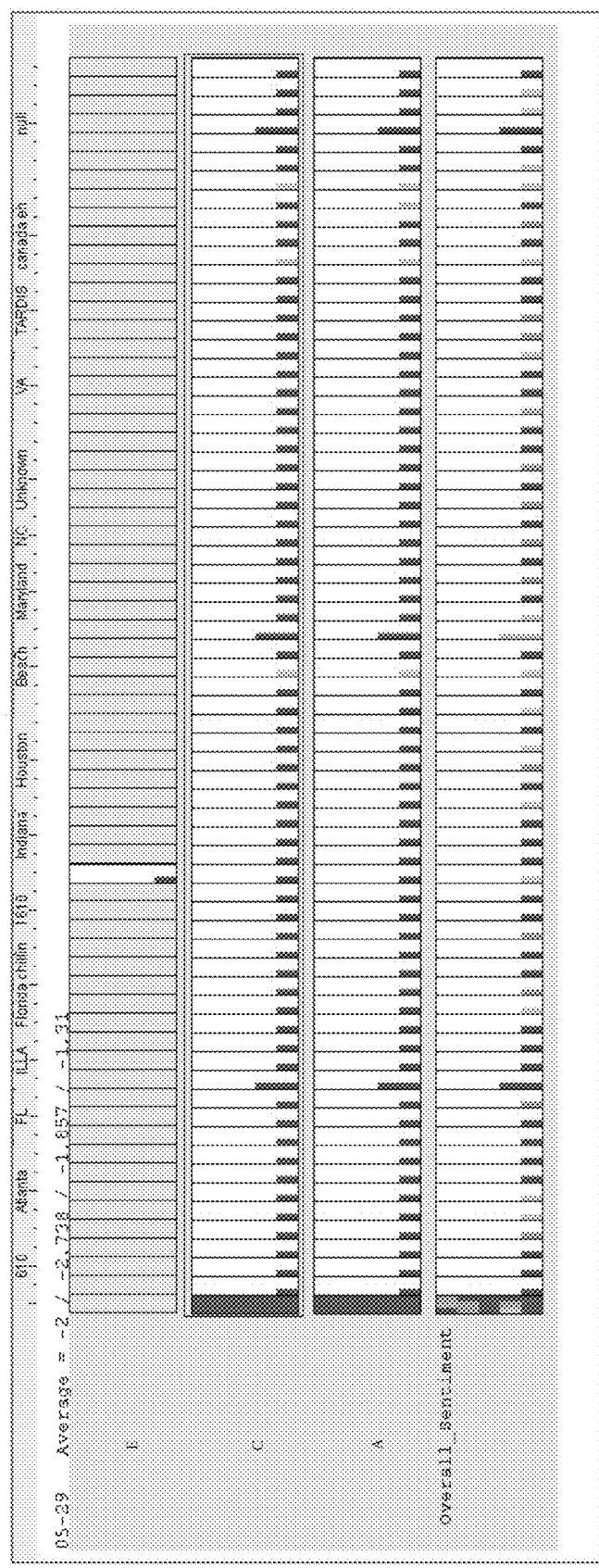
FIG. 6 illustrates a portion of a calendar graphical visualization for depicting locations of users who submitted reviews, in accordance with further examples.

In accordance with some implementations, techniques or mechanisms according to some implementations also allow an analyst to drill down to obtain location information of reviewers. For example, in FIG. 6, a graphical visualization 600 has an array of blocks in which columns correspond to different geographic locations. Within each block, red or green or gray pixels are arranged for indicating whether the particular location has provided a positive, negative or neutral sentiment for respective attributes.

Using techniques or mechanisms according to some implementations, an analyst can quickly identify sentiment distributions, patterns, and influence. Moreover, an analyst can focus on an interesting area within the calendar graphical visualization to query for correlations and to find further detailed information, such as sources (locations) of reviews.

Figure 7:
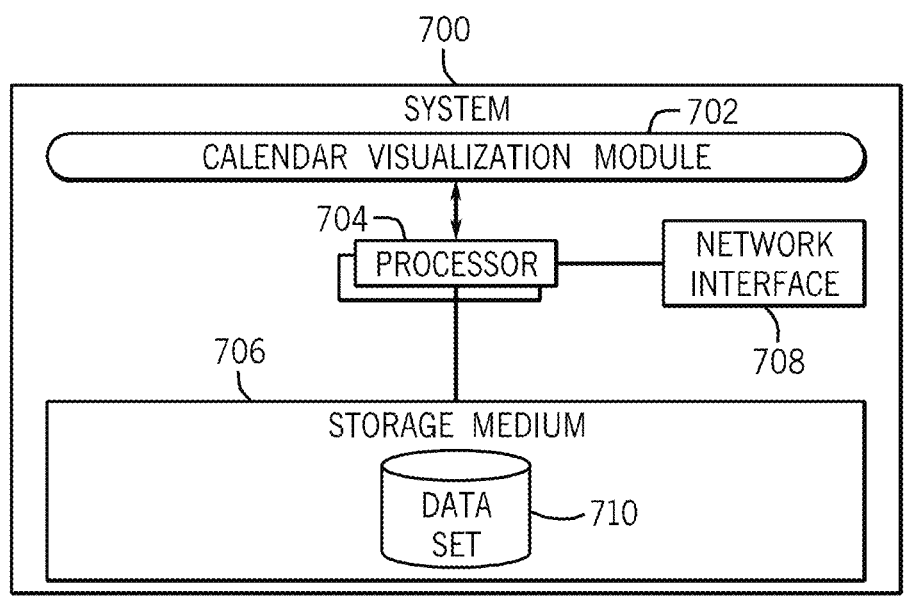
FIG. 7 is a block diagram of an example system incorporating some implementations.

FIG. 7 is a block diagram of an example system 700 that has a calendar visualization module 702 according to some implementations. The calendar visualization module 702 can perform various tasks discussed above, including those depicted in connection with FIG. 3 and other tasks.

The calendar visualization module 702 can be implemented as machine-readable instructions executable on one or multiple processors 704. The processor(s) 704 can be connected to a storage medium (or storage media) 706 and to a network interface 708 (for communicating over a data network). A processor can include a microprocessor, a microcontroller, a processor module or subsystem, a programmable integrated circuit, a programmable gate array, or another control or computing device. The storage medium (or media) 706 can store a data set 710 that has been received by the system 700, where the data set 710 can include various data records that contain a sentiment attribute and other attributes.

The storage medium (media) 706 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method executed by a computer, comprising:
generating a calendar graphical visualization that includes an arrangement of blocks including pixels representing data records containing user feedback, wherein plural groups of the blocks represent different attributes of the data records, and wherein the blocks correspond to respective time intervals;
determining a particular size of the blocks based on identifying a union of time positions corresponding to data records received for the different attributes in a particular time interval of the time intervals, wherein each of the blocks has the particular size, and wherein the union of time positions comprises a union of at least time positions corresponding to first data records received for a first of the different attributes in the particular time interval and time positions corresponding to second data records received for a second of the different attributes in the particular time interval, the first data records represented in a first group of the plural groups of the blocks, and the second data records represented in a second group of the plural groups of the blocks; and
aligning pixels in a first of the blocks corresponding to the first attribute with pixels in a second of the blocks corresponding to the second attribute by placing gaps in the first and second blocks at respective time positions that are missing values for corresponding ones of the attributes.

2. The method of claim 1, wherein generating the calendar graphical visualization comprises generating the calendar graphical visualization that represents the data records in plural time dimensions, wherein a first of the time dimensions differs from a second of the time dimensions.

3. The method of claim 2, wherein a row of the blocks corresponds to the first time dimension, and a column of the blocks corresponds to the second time dimension.

4. The method of claim 3, wherein the plural groups include plural ones of the rows, where each of the rows corresponds to a corresponding one of the attributes.

5. The method of claim 1, further comprising:
placing pixels representing corresponding data records in each of the blocks, wherein the placing includes ordering the placed pixels according to time attribute values associated with the corresponding data records.

6. The method of claim 1, further comprising assigning a visual indicator to each of the pixels according to a sentiment value associated with a corresponding one of the attributes.

7. The method of claim 6, wherein assigning the visual indicator comprises assigning a color selected from among plural colors that represent different sentiment values.

8. The method of claim 1, further comprising:
receiving selection of a portion of the calendar graphical visualization corresponding to a particular one of the attributes;
in response to the received selection, causing display of a correlation measure indicating a correlation between the particular attribute and another attribute.

9. The method of claim 1, further comprising:
causing display of another arrangement of blocks to identify locations associated with the data records.

10. The method of claim 1, wherein the aligning comprises:
aligning, according to time, pixels in the first block with pixels in the second block, wherein the first block and the second block have a same number of time positions, and wherein time positions in the first block or second block not associated with values for a corresponding one of the attributes is provided with a gap instead of a pixel.

11. The method of claim 1, wherein the union of time positions comprises the union of at least the time positions corresponding to the first data records, the time positions corresponding to the second data records, and time positions corresponding to third data records received for a third of the different attributes in the particular time interval, the third data record represented in a third group of the plural groups of the blocks.

12. The method of claim 1, wherein the first block has an array of time positions that is identical to an array of time positions in the second block, wherein a first pixel representing a data record for the first attribute is placed at a first time position of the array of time positions in the first block, and wherein a gap is placed at the first time position of the array of time positions in the second block, the gap placed at the first time position in the second block indicating no corresponding data record exists for the second attribute.

13. An article comprising at least one machine-readable storage medium storing instructions that upon execution cause a system to:
receive data records containing sentiment values regarding different attributes, the sentiment values based on user feedback;
generate a calendar graphical visualization that includes an arrangement of blocks containing pixels representing corresponding data records of the received data records, wherein plural groups of the blocks represent respective attributes of the different attributes, and wherein the blocks correspond to respective time intervals;
determine a particular size of the blocks based on identifying a union of time positions corresponding to data records received for the different attributes in a particular time interval of the time intervals, wherein each of the blocks has the particular size, and wherein the union of time positions comprises a union of at least time positions corresponding to first data records received for a first of the different attributes in the particular time interval and time positions corresponding to second data records received for a second of the different attributes in the particular time interval, the first data records represented in a first group of the plural groups of the blocks, and the second data records represented in a second group of the plural groups of the blocks; and
align pixels corresponding to the different attributes represented by the plural groups of the blocks by placing gaps in respective blocks at respective time positions that are missing sentiment values for corresponding ones of the attributes.

14. The article of claim 13, wherein the aligning comprises:
aligning, according to time, pixels in a first block in the first group of blocks with pixels in a second block in the second group of blocks, wherein the first block and the second block have a same number of time positions, and wherein time positions in the first block or second block not associated with sentiment values for a corresponding one of the attributes is provided with a gap instead of a pixel.

15. The article of claim 13, wherein the instructions upon execution cause the system to further:
assign different colors to the pixels according to different sentiment values.

16. The article of claim 13, wherein the instructions upon execution cause the system to further:
order pixels within a given one of the blocks according to time attribute values of corresponding data records represented by the ordered pixels.

17. The article of claim 13, wherein the instructions upon execution cause the system to further:
receive user selection indicating a query for further information; and
in response to the user selection, cause display of correlation measures between attributes.

18. A system comprising:
a storage medium to store a data set containing data records containing user feedback; and
at least one processor to:
generate a calendar graphical visualization that includes an arrangement of blocks including pixels representing the respective data records, wherein plural groups of the blocks represent different attributes of the data records, and wherein the blocks correspond to respective time intervals;
determine a particular size of the blocks based on identifying a union of time positions corresponding to data records received for the different attributes in a particular time interval of the time intervals, wherein each of the blocks has the particular size, and wherein the union of time positions comprises a union of at least time positions corresponding to first data records received for a first of the different attributes in the particular time interval and time positions corresponding to second data records received for a second of the different attributes in the particular time interval, the first data records represented in a first group of the plural groups of the blocks, and the second data records represented in a second group of the plural groups of the blocks; and
align pixels in a first of the blocks corresponding to the first attribute with pixels in a second of the blocks corresponding to the second attribute by placing gaps in the first and second blocks at respective time positions that are missing values for corresponding ones of the attributes.

19. The system of claim 18, wherein the calendar graphical visualization represents the data records of the data set in plural time dimensions, wherein a first of the time dimensions differs from a second of the time dimensions.

20. The system of claim 18, wherein the at least one processor is to further:
place pixels representing corresponding data records in each of the blocks, wherein the placing includes ordering the placed pixels according to time attribute values associated with the corresponding data records.

21. The system of claim 18, wherein the aligning comprises:
aligning, according to time, pixels in the first block with pixels in the second block, wherein the first block and the second block have a same number of time positions, and wherein time positions in the first block or second block not associated with values for a corresponding one of the attributes is provided with a gap instead of a pixel.

* * * * *